United States Patent [19]

Howard

[11] 4,095,223
[45] June 13, 1978

[54] FOUR-DIMENSIONAL ISOMETRIC RADAR TARGET IMAGE DISPLAY

[75] Inventor: Dean D. Howard, Oxon Hill, Md.

[73] Assignee: The United States of America as represented by the Secretary of the Navy, Washington, D.C.

[21] Appl. No.: 785,976

[22] Filed: Apr. 8, 1977

[51] Int. Cl.² ............................................. G01S 7/20
[52] U.S. Cl. ........................................ 343/7.9; 343/17
[58] Field of Search ...................... 343/7.9, 17; 358/89

[56] References Cited

U.S. PATENT DOCUMENTS

| | | | |
|---|---|---|---|
| 2,648,061 | 8/1953 | Parker et al. | 343/7.9 |
| 3,671,730 | 6/1972 | Pilato | 343/7.9 X |
| 3,747,097 | 7/1973 | Howard | 343/17 X |
| 3,792,423 | 2/1974 | Becker et al. | 343/7.9 X |

Primary Examiner—Maynard R. Wilbur
Assistant Examiner—Richard E. Berger
Attorney, Agent, or Firm—R. S. Sciascia; Philip Schneider; David G. Rasmussen

[57] ABSTRACT

A target indicating system includes a high-range-resolution monopulse radar which produces four dimensions of data: a range trigger signal, elevation angle error data, azimuth angle error data, and range video data. Additionally included is a display system having an x-y display for presenting the four dimensions of data. The display is improved by the addition of a sweep generator, elevation summary amplifier, and azimuth summing amplifier which cause the trace on the display to be driven diagonally and generate an isometric presentation of the four dimensions of data.

2 Claims, 5 Drawing Figures

FOUR-DIMENSIONAL ISOMETRIC RADAR TARGET IMAGE DISPLAY

BACKGROUND OF THE INVENTION

1. Field of the Invention

This invention relates to a display system for a conventional high-range-resolution monopulse radar and especially to a display system which utilizes four dimensions of target data, namely, azimuth, elevation, range and range video to form an isometric image of the target on an x-y display.

2. Description of the Prior Art

Tracking radars are used principally for continuously measuring the position of a target in range, azimuth angle and elevation angle. These radars typically employ an antenna which radiates a pencil-beam from a rotating platform which is controlled in azimuth and elevation position by angular error signals which cause the antenna to change position keeping the target centered in the beam. These radars also typically employ a display which shows the target as a point source of brightness on a CRT usually indicating the range, range and azimuth, or range, azimuth and elevation of the target, depending on the type of display.

High-range-resolution monopulse radars such as described in U.S. Pat. No. 3,747,097 resolve the return signal from each reflecting surface of a target thus allowing the radar to obtain azimuth, elevation, range and range video information for each reflecting surface. Range video information is the radar echo amplitude of the signal returned from each reflecting surface which indicates its cross-sectional area.

Resolution of each part of a target provides information for a complete target image to be presented on either an x-y display or a three-dimensional display. U.S. Pat. No. 3,747,097 describes a visual display system which presents a target image on an x-y display. This x-y target image displays three dimensions of data, either range, azimuth and range video information or range, elevation and range video information. However, such a system cannot display both elevation and azimuth information simultaneously.

To overcome this, three-dimensional display presentations such as that shown in U.S. Pat. No. 3,887,917 and 3,555,349 were developed. These three-dimensional displays require a series of planar display windows in a stacked fashion which allow four dimensions of data to appear in three dimensions. These displays are structurally complicated and expensive.

U.S. Pat. No. 3,792,423 describes an isometric imaging system for obtaining the projection of four dimensions of data onto an x-y display. The technique described has several drawbacks in that all x and y values to the display must undergo a trigonometric transformation and the isometric image is constructed slowly on the display by a scanning technique.

SUMMARY OF THE INVENTION

The present invention is an improved display system for isometrically displaying a target image utilizing elevation angle error data, azimuth angle error data, range video data, and a range trigger signal all obtained from a conventional high-range-resolution monopulse radar. The display system includes a sweep generator which receives and responds to the range trigger signal and generates a sweep voltage. The sweep voltage is fed to both an elevation summing amplifier and an azimuth summing amplifier. The elevation summing amplifier additionally receives the elevation angle error data and sums it with the sweep voltage. Similarly, the azimuth summing amplifier receives the azimuth angle error data and sums it with the sweep voltage. The outputs of the azimuth and elevation summing amplifier are fed, respectively, to the horizontal and vertical inputs of an x-y display to drive the horizontal and vertical beam displacements. The resultant display trace is a diagonal trace modulated by the elevation and azimuth angle error data. The range video data from the radar is fed to the intensity control of the display to control the intensity of the display. The result of the informatiion entered at the horizontal, vertical and intensity inputs of the display is to present an isometric image of the target on the display.

In an alternative embodiment, elevation and azimuth control amplifiers are used to control the gain of the sweep voltage being fed to the elevation and azimuth summing amplifiers. By controlling either the azimuth or elevation sweep voltage, the isometric image of the target may be tilted to obtain a better isometric view.

The use of an x-y display and range video information to control its intensity is known in the art. The novel feature of the improved display system is the use of the sweep generator in cooperation with the elevation and azimuth summing amplifiers to provide elevation and azimuth angle error information to the horizontal and vertical inputs of the display to obtain a diagonal trace that will present a target isometrically on the display surface.

A second novel feature is the use of the elevation and azimuth control amplifiers to enable the isometric image of the target to be tilted for better viewing.

DESCRIPTION OF THE PREFERRED EMBODIMENT

Figure 1:
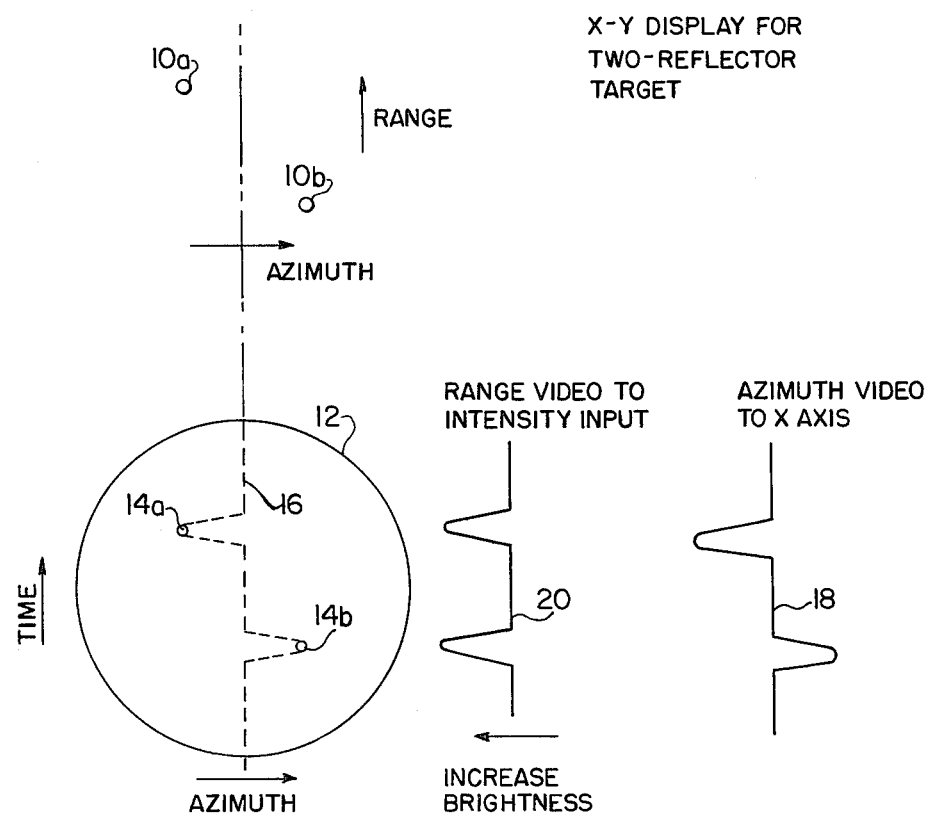
FIG. 1 is a diagrammatic representation of a prior art system for displaying three dimensions of target data on an x-y display.

FIG. 1 illustrates the prior art principles of how three dimensions of target data, i.e., azimuth, range and range video (the echo amplitude of the target) from a high-range-resolution monopulse radar are used to generate a conventional two-dimensional display image on an x-y display. The signal echoes from two reflection areas 10a and 10b on a single radar target are displayed on CRT 12 and shown as brightened spots 14a and b. The CRT trace 16, shown as a vertical dotted line, is started by the range trigger and sweeps with increasing time which is proportional to range at the same time the angular azimuth video 18, applied to the horizontal deflection plates, deflects the trace by an amount proportional to the target's azimuth angular position in relation to the bore sight of the antenna. The trace is normally blanked and maintained at a very low brightness. This brightness is intensified by range video 20 indicating the presence of a target at the same time the trace is being deflected horizontally by the azimuth video. Thus, the target would appear as two brightened spots indicating the precise range and angular location of the two reflector portions of the target.

This figure shows how the azimuth and range video information occur simultaneously on the display, thus allowing presentation of the target image. Similar principles are used in the display system of the invention described hereinafter.

Figure 2:
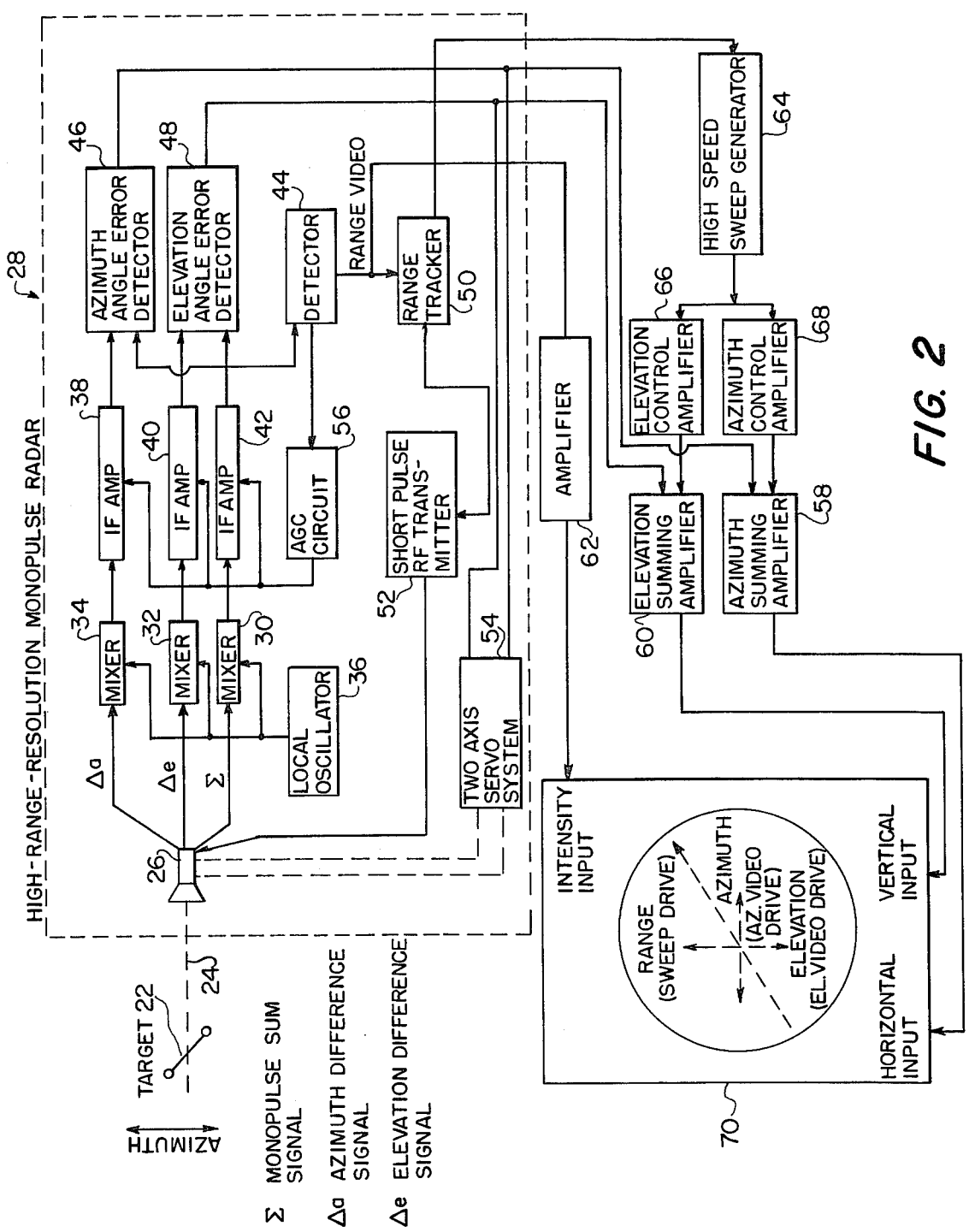
FIG. 2 is a schematic of the system of the present invention for displaying four dimensions of target data isometrically on an x-y display.

FIG. 2 shows a conventional high-range-resolution monopulse radar system and the novel isometric display system of the invention. A target 22 is shown as having two reflecting surfaces located on either side of the antenna boresight line 24 of antenna 26 which is contained in high-range-resolution monopulse radar 28. Antenna 26 receives reflected information and separates this information into a sum signal $\Sigma$, an elevation difference signal $\Delta e$ and an azimuth difference signal $\Delta a$. These three received signals are fed to mixers 30, 32, 34, respectively, where the signals are mixed with the signal from the local oscillator 36. The mixer output signals are supplied to IF amplifiers 42, 40, 38. The sum signal from IF amplifier 42 is connected to an amplitude detector 44 and to both the azimuth angle error detector 46 and elevation angle error detector 48. The respective angular difference signals from IF amplifiers 38, 40 are fed to the angle error detectors 46 and 48, respectively, both of which may be phase-sensitive detectors which give a bipolar video output the amplitude of which is indicative of the angular position of the portions of the target respective to the antenna bore sight. The range video from detector 44 is coupled to a range tracker 50. Range tracker 50 is the timing circuit for the radar. Previously, it established a reference time at which it sent a pulse to the short pulse RF transmitter 52 to cause the radar to start transmitting and simultaneously started counting time from the transmission. Range tracker 50 uses the counted time and the range video information to generate a range trigger signal when a target echo is expected. The range trigger signal, as will be explained subsequently, will be used to start the horizontal and vertical sweeps of the display.

A two-axis servo system 54 controls antenna 26 by using the elevation and azimuth angle error information derived from the error detectors 46 and 48. AGC circuit 56 controls the gain of the IF amplifiers 38, 40, 42 by using the output of the detector 44.

The azimuth and elevation angle errors from detectors 46, 48, respectively, the range video from detector 44, and the range trigger signal from range tracker 50 are all fed from high-range-resolution monopulse radar 28 to the display system of the present invention. The azimuth and elevation angle error signals are fed to azimuth and elevation summing amplifiers 58, 60, respectively. The range video signal is fed to amplifier 62. The range trigger signal from range tracker 50 is fed to a high-speed sweep generator 64 which initiates a sweep voltage which is fed through elevation and azimuth control amplifiers 66, 68 to elevation and summing amplifiers 60, 58, respectively. Elevation and azimuth control amplifiers 66, 68 are variable gain amplifiers and control the magnitude of the sweep voltage going to elevation and azimuth summing amplifiers 60, 58. The azimuth angle error signal and the sweep signal are summed in azimuth summing amplifier 58 while the elevation angle error signal and sweep signal are summed in elevation summing amplifier 60. The signal from azimuth summing amplifier 58 is fed to the horizontal input of display 70 and the signal from elevation summing amplifier 60 is fed to the vertical input of the display. The range video output from amplifier 62 is fed to the intensity control input of the display. The azimuth data will be swept horizontally on the display and the elevation data will be swept vertically on the display. The result will be an isometric presentation of the target with range data (i.e., range difference between reflecting resolved parts of the target) displayed along the diagonal dotted line of the display.

Figure 3B:
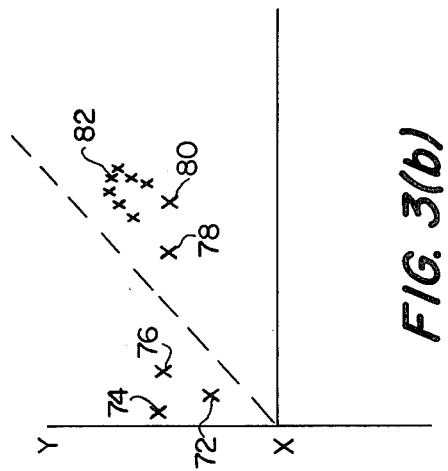
FIGS. 3(a)-3(c) show a target as seen by a radar and presented isometrically on a display.
Figure 3C:
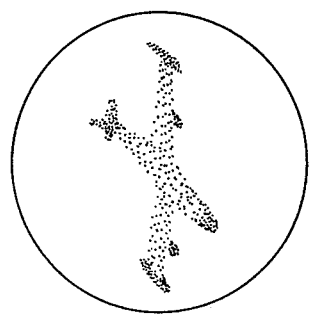
Figure 3A:
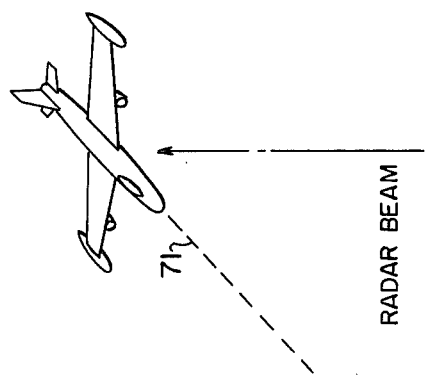

FIG. 3 shows a target (e.g., an airplane) as seen by the radar and presented isometrically on the x-y display. In FIG. 3(a) the line of flight 71 of the target is shown as being a few degrees different from the direction of the radar beam. The dominant reflectors of the aircraft are the nose, engines, wing tanks and tail.

FIG. 3(b) shows a graphical presentation of the positioning of the dominant reflectors in the display coordinate system utilizing the azimuth, elevation, range and range video information. The first radar return will be from the aircraft nose therefore the x and y sweeps will be positioned at point 72. A short time later, radar returns will be received in order from the right wing tank, right engine, left engine and left wing tank. The reflectors will have similar elevation information, slightly different range information and substantially different azimuth information. They will be displayed at points 74, 76, 78 and 80. A short time later, the radar returns from the tail will be received. These returns will have varying elevation information and range information which will cause the x and y sweeps to outline the tail, designated as 82.

FIG. 3(c) shows an outline of the target aircraft presented isometrically on the display. The dominant reflecting surfaces correspond to points 72–82 of FIG. 3(b). Elevation is clearly shown by the tail assembly, azimuth is clearly shown by the separation of the engines and wing tanks, range is shown by the separation of the nose and tail diagonally along the display and the echo amplitude is shown by the intensity with which the dominant reflectors are shown.

In operation, antenna 26 of high-range-resolution monopulse radar 28 sends out a narrow radar beam which is centered approximately on the midpoint of the aircraft and will track the aircraft. The radar resolves in the range coordinate to within about 45cm and can therefore resolve different reflecting portions of the aircraft. In addition, the azimuth (right or left of the radar beam) and elevation (above or below the radar beam) of each reflector can be measured independently for each resolved reflector.

A sample of the radar return received by antenna 26 is sent through its sum port to mixer 30, IF amplifier 42, detector 44, and to range tracker 50. Range tracker 50 will track the time of the center-of-gravity of the radar return from all parts of the target. It may utilize the average of several intervals of radar data. Therefore, it can predict closely when each echo from the target will arrive. It will use this information to generate a range trigger signal at a time just preceding the arrival of the target radar returns. The range trigger signal signifies that the target returns are about to be received and the x (azimuth) and y (elevation) sweeps of the display must be initiated.

As the radar returns are received by antenna 26 they are separated into a monopulse sum signal $\Sigma$, an azimuth difference signal $\Delta a$, and an elevation difference signal $\Delta e$. These signals are processed by the remainder of high-range-resolution monopulse radar 28 to obtain an azimuth angle error signal, an elevation angle error signal, and a range video signal. In summary, the outputs from conventional high-range-resolution monopulse radar 28 are the range trigger signal, the azimuth and elevation angle error signals, and the range video signal.

These four dimensions of data are supplied to display 70 to obtain an isometric presentation in the following manner. The range trigger signal is fed to high-speed sweep generator 64 which generates a sweep voltage. This voltage is applied to elevation and azimuth control amplifiers 66, 68. These amplifiers control the magnitudes of the voltages for the $x$ and $y$ sweeps and allow the isometric image to be tilted. The outputs of elevation and azimuth control amplifiers 66, 68 are fed to elevation and azimuth summing amplifiers 60, 58. The outputs of elevation and summing amplifiers 60, 58 are fed to the vertical and horizontal inputs, respectively, of display 70 to start the $x$ (azimuth) and $y$ (elevation) sweeps. A radar return from a reflector which contains azimuth and elevation angle information is received a short time later. The azimuth information is fed to azimuth summing amplifier 58 where it is modulated on the sweep voltage for the horizontal display sweep and presented on the display. Similarly, the elevation information is fed to elevation summing amplifier 60 for presentation on the vertical display sweep. For a second reflector, the radar returns will come in at a later time and the same procedure will be followed to put the azimuth and elevation information on the display at a point further along the sweep.

Since the range trigger signal started both the $x$ and $y$ sweeps simultaneously, the resultant sweep they generate is a diagonal sweep. The diagonal sweep increases with time and is proportional to range. Therefore, range information of each reflector is displayed diagonally on the display. Each reflector has its azimuth and elevation angle information presented on the display at a different time since the radar return for each reflector is received at a different time. These differences in time represent differences in range and are the range information presented on the diagonal sweep of the display. For example, the radar returns for the nose and tail section are received at different times and are displayed at different places along the diagonal sweep.

The range video for each reflector is fed from detector 44 through amplifier 62 to the intensity control of display 70. The operation is the same as for the conventional system shown in FIG. 1. The range video signal for a particular reflector will cause the display to brighten at the same time the azimuth and elevation information is displayed.

The result of presentation of the azimuth, elevation, range, and range video data is an isometric representation on the display. FIG. 3 is an example of the isometric presentation of an aircraft on the display.

Obviously many modifications and variations of the present invention are possible in light of the above teachings. It is therefore to be understood that within the scope of the appended claims the invention may be practiced otherwise than as specifically described.

What is claimed and desired to be Secured By Letters Patent of the United States is:

1. In a target-indicating system including a high-range-resolution monopulse radar which produces a range trigger signal and elevation angle error data, azimuth angle error data and range video data from the echo signals received from a target, and further includes a display system having an $x$-$y$ display with vertical, horizontal and intensity inputs for controlling a display trace, said range video data being provided to said intensity input, the improvement to said display system which comprises:

sweep generator means receiving said range trigger signal for generating a sweep voltage in response to said range trigger signal;

elevation summing amplifier means for receiving and summing said elevation angle error data and said sweep voltage generated by said sweep generator, the output of said elevation summing amplifier being fed to said vertical input of said display system for driving said display trace vertically and modulating said elevation angle error data on said display trace; and azimuth summing amplifier means for receiving and summing said azimuth error data and said sweep voltage generated by said sweep generator, the output of said azimuth summing amplifier being fed to said horizontal input of said display system for driving said display trace horizontally and modulating said azimuth angle error data on said display trace; and said outputs of said azimuth and elevation summing amplifiers causing said display trace to be driven diagonally and generating an isometric presentation of said target data.

2. In a target indicating system including a high-range-resolution monopulse radar which produces a range trigger signal, elevation angle error data, azimuth angle error data and range video data from the echo signals received from a target, and further includes a display system having an $x$-$y$ display with vertical, horizontal, and intensity inputs for controlling a display trace, said range video data being provided to said intensity input, the improvement to said display system which comprises:

sweep generator means receiving said range trigger signal for generating a sweep voltage in response to said range trigger signal;

elevation control amplifier means receiving said sweep voltage for amplifying and controlling the gain of said sweep voltage;

azimuth control amplifier means receiving said sweep voltage for amplifying and controlling the gain of said sweep voltage;

elevation summing amplifier means for receiving and summing said elevation angle error data and the output of said elevation control amplifier, the output of said elevation summing amplifier being fed to said vertical input of said display system for driving said display trace vertically and modulating said elevation angle error data on said display trace; and azimuth summing amplifier means for receiving and summing said azimuth angle error data and the output of said azimuth control amplifier, the output of said azimuth summing amplifier being fed to said horizontal input of said display system for driving said display trace horizontally and modulating said azimuth angle error data on said display trace; and said outputs of said azimuth and elevation summing amplifiers causing said display trace to be driven diagonally and generating an isometric presentation of said target on said display surface, said elevation and azimuth control amplifiers enabling the isometric image of the target to be tilted for better viewing.

* * * * *